INVENTOR.
H. W. KOREN

BY

Greene, Pineles & Durr
ATTORNEYS

Jan. 11, 1955 H. W. KOREN 2,699,470

PHONOGRAPH PICKUP

Filed Feb. 21, 1951 4 Sheets-Sheet 2

INVENTOR.
H. W. KOREN

BY

Greene, Pineles & Durr
ATTORNEYS

Jan. 11, 1955 H. W. KOREN 2,699,470

PHONOGRAPH PICKUP

Filed Feb. 21, 1951 4 Sheets-Sheet 3

INVENTOR.
H. W. KOREN

BY

Greene, Pineles & Durr
ATTORNEYS

Jan. 11, 1955 H. W. KOREN 2,699,470

PHONOGRAPH PICKUP

Filed Feb. 21, 1951 4 Sheets-Sheet 4

INVENTOR.
H. W. KOREN

BY

Greene, Pineles, & Durr
ATTORNEYS

United States Patent Office 2,699,470

Patented Jan. 11, 1955

2,699,470

PHONOGRAPH PICKUP

Heiman W. Koren, New York, N. Y., assignor to Sonotone Corporation, Elmsford, N. Y., a corporation of New York Application February 21, 1951, Serial No. 212,115

12 Claims. (Cl. 179—100.41)

This invention relates to phonograph pickups and more particularly to phonograph pickups which are utilized for transducing undulations of record traces, usually in the form of an undulating record groove, into corresponding electric signal waves.

Although the present invention was evolved in connection with a phonograph pickup intended for use with laterally-cut record-groove traces and specific exemplifications thereof will be herein described, the principles of the invention are also applicable for pickups designed for use with vertically cut record grooves.

All generally used phonograph pickups have a mechano-electric transducer which is driven by a stylus engaging the moving record groove of a record disc or the like for translating the undulations of the record trace into corresponding voltages. The stylus is usually carried in the forward end of a transducer drive-rod.

In the past, substantially all high-quality phonograph pickups operated with a stylus which extended from the drive rod at an angle greater than 90° with respect to the forward direction of the motion of the record trace, although some of the earlier pickups also operated with a stylus positioned substantially perpendicular to the direction of the moving record groove trace engaged thereby.

The present invention is based on the discovery that phonograph pickups of the foregoing type will operate with superior characteristics and much greater stability in maintaining proper operating engagement between the stylus and the record groove, provided the stylus is mounted on the drive-end of the drive-rod so that the stylus axis maintains an acute angle with forward direction of the moving record trace.

It is accordingly among the objects of the invention to provide a phonograph pickup in which the stylus carried on a drive-end of a transducer drive-rod has a stylus axis extending at an angle less than about 85° and more than about 45° relatively to the direction of the forward motion or record playing direction of the record trace engaged by the stylus.

A further object of the invention is a phonograph pickup having a transducer drive-arm carrying at its forward end a set of two oppositely directed styli and arranged so as to make it possible to rotate the drive-arm with its styli over an angle of about 180° for selectively bringing the tip of one or the other of the two styli into operative engagement with the record trace, with the axis of each stylus extending at an angle less than about 85° and more than about 45° relatively to the forward transducing direction of the record trace engaged thereby.

The foregoing and other objects of the invention will be best understood from the following description of exemplifications thereof, reference being had to the accompanying drawings wherein Fig. 1 is a side elevational view of one form of a phonograph pickup of the invention, shown carried on the forward end of a conventional phonograph tone-arm, with the stylus of the pickup engaging a record groove trace of a conventional record disc as it is being driven to rotate in the conventional clockwise direction;

Fig. 2 is a greatly enlarged view similar to Fig. 1 of the same pickup;

Fig. 2–*a* is a diagrammatic view showing the relationship of the axis of the stylus to the axis of the stylus drive-arm and to the direction of the forward motion of the record trace;

Although the phonograph pickups of the present invention may be operated with any of the known types of mechano-electric transducer structures—including those utilizing magnetic structures, electrical resistance elements and piezo-electric structures for converting mechanical strains or motion into electric signals—the present invention will be described in connection with a pickup utilizing a piezo-electric transducer of the type disclosed in the co-pending applications Serial No. 727,152, filed February 7, 1947, and Serial No. 772,934, filed September 9, 1947, assigned to the assignee of the present application.

Figures 1, 2, 2A, 3:
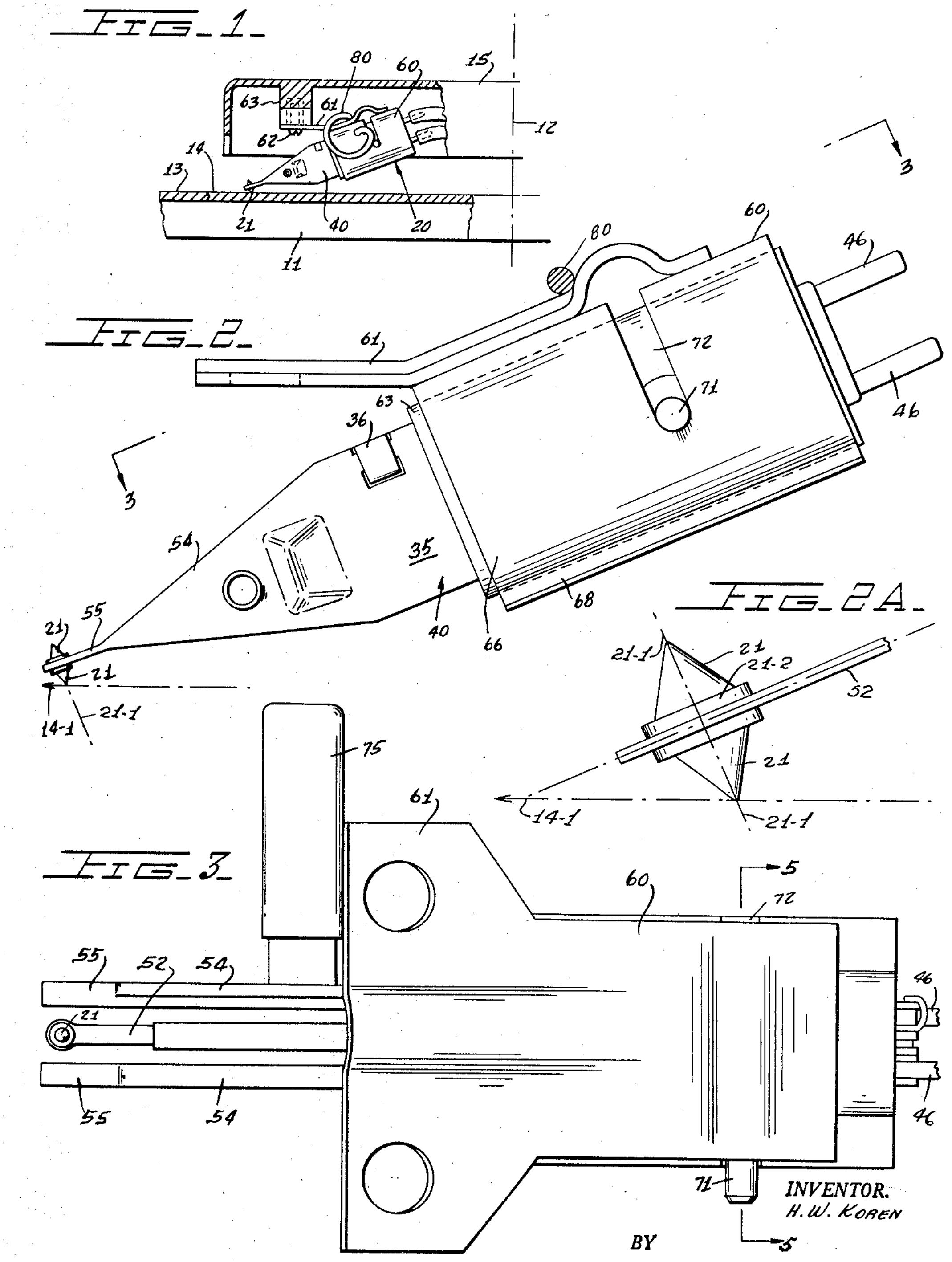
Fig. 3 is a plan view of the stylus of Figs. 1 and 2.
Figure 4:
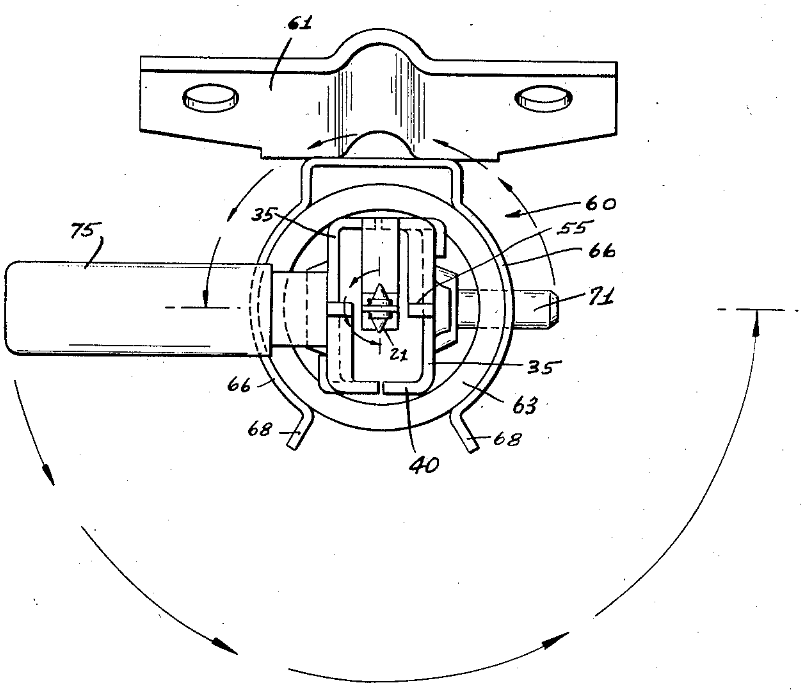
Fig. 4 is a front end view of the phonograph pickup of Figs. 2 and 3, seen in the direction of its longitudinal axis.
Figure 5:
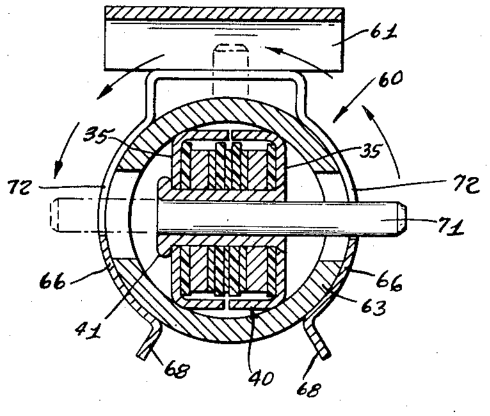
Fig. 5 is a cross-sectional view along lines 5—5 of Fig. 3.
Figures 6, 7, 8, 9:
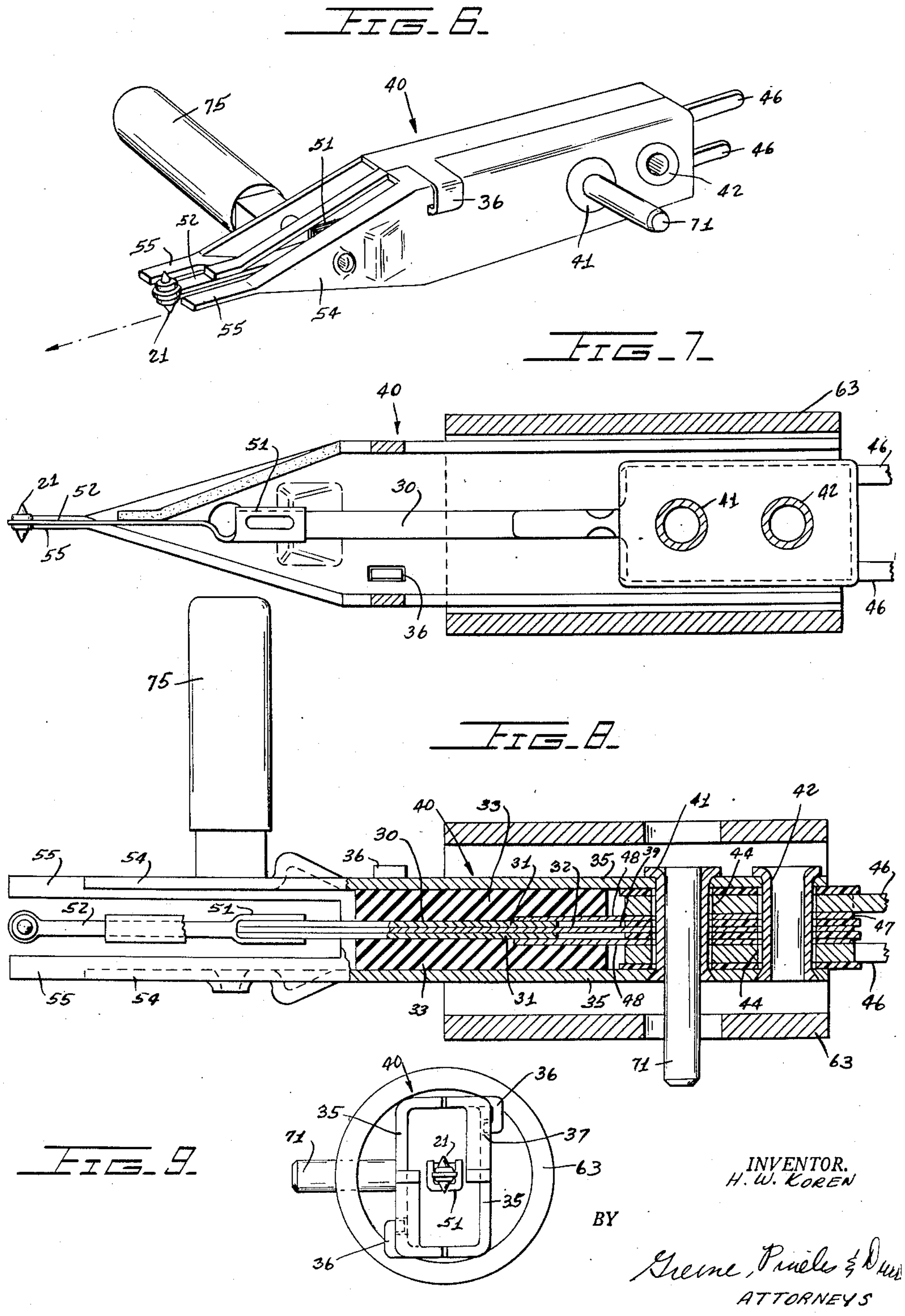
Fig. 6 is a perspective view of the transducer pickup assembly of the pickup of Figs. 1 to 5, without its rotary guide structure.
Fig. 7 is a side view of the transducer pickup assembly with its associated rotary guide structure.
Fig. 8 is a plan view of the pickup assembly of Fig. 7, with parts shown in cross-section.
Fig. 9 is an end view of the pickup assembly of Fig. 8, seen from the right end thereof.

Fig. 1 indicates in a general way the principal elements of a conventional disc type phonograph in connection with which a phonograph pickup of the invention may be used. The phonograph is shown comprising a conventional turntable 11 arranged to rotate in a conventional way in clockwise direction around a generally vertical axis 12. The turntable carries on its upper side a conventional record disc 13 a portion of which is shown in cross-section and it has on its upper face a spiral record groove trace 14, the individual trace turns of which are of a substantially circular shape. A conventional pickup arm or tone-arm 15 has a rear end, not shown, which is mounted in a conventional way so as to rotate around a vertical axis and also for upward tilting and to hold at its front end the pickup 20 having a pickup stylus 21. Fig. 1 is intended to show the groove portion 14 of the record disc engaged by the stylus 21 rotating from the right to the left in clockwise direction with the axis of the stylus drive-arm carried by the tone arm 15 in a direction substantially tangential to the substantially circular record groove engaged by the stylus 21.

In the particular phonograph shown in Fig. 1 the record trace 14 is formed of a laterally-cut record groove which imparts to the pickup stylus 21 a lateral undulatory motion, but as explained before, the pickup 20 of the invention shown designed for operation with a vertically cut record groove.

The pickup 20 shown in Fig. 1 represents one form of the invention, and it is shown in more detail in Figs. 2 to 9. It comprises a mechano-electric transducer 30 shown formed of two strip-like piezo-electric transducer elements 31 secured to the opposite sides of a backing sheet element 32 and forming with it a bilaminate piezo-electric transducer structure which when bent or strained transversely to its length will generate aiding voltages impressed on the outwardly facing electrode surfaces of the two piezo-electric elements 31. In the form shown, each of the two piezo-electric elements 31 consists essentially of a thin solid dielectric layer of ceramic titanate material and two surface electrodes united to the extended opposite outer surfaces of the dielectric layer so as to form therewith a capacitor structure. The surface electrodes are formed by fusing at high temperature a film of silver-glass frit to the electrode surfaces of the dielectric layer.

As disclosed in the co-pending application Serial No. 772,934, filed September 9, 1947, such ceramic titanate layer capacitor may be rendered piezo-electric by applying to its electrode surfaces a D. C. polarizing potential somewhat less than the breakdown potential of the dielectric layer. The backing sheet element 32 is formed of a suitable metal such as stainless steel or another metal alloy and the two piezo-electric elements 31 are united to the metallic backing element 32 by soldering with a conventional solder used for making electric soldering joints, such as having a melting temperature of about 230° to 250° C. or higher. Since the thermal expansion coefficient of the metal strip 32 is much greater than that of the ceramic dielectric layer of the two piezo-electric elements 31, the thin dielectric bodies are compressed when the combined soldered assembly is cooled to normal temperature below the freezing temperature of the solder junction films. As a result, the combined piezo-electric transducer unit 30, shown is very stable in operation, and when subjected to bending strains the thin fragile dielectric layer bodies will not fracture because they are subjected principally to variations of compression strain while carrying on transducing operations under the undulatory strains imparted thereto by the stylus 21.

Without in any way thereby limiting the scope of the invention there are given below characteristic data for one form of piezo-electric unit 30 used in a practical phonograph pickup of the invention of the type shown. Each piezo-electric element has a dielectric layer consisting essentially of barium titanate having a thickness of about 0.010 inch. The width of each dielectric layer and of the backing sheet is $\frac{3}{64}$ of an inch. The length of each piezo-electric element is about $\frac{5}{8}$ of an inch. The backing strip is about .005 to .010 inch thick.

The lever-like piezo-electric transducer 30 is retained in operative position between two pads 33 of a plasticized elastomer substance, which are arranged to exert on the transducer elements 31 elastically compliant reaction forces resisting their displacement and to generate therein electric signal voltages corresponding to the undulatory motion imparted to the front end of the transducer 30. The elastomer pads may be made of a material such as a vinyl chloride compound or the like, which embodies sufficient plasticizer substance to serve as plastic elastomers which are effective in assuring that they exert on the piezo-electric strip elements 31 reaction forces which cause proper distribution of the mechanical strains throughout their dielectric layers when the front end of the transducer structure is undulated by the movement of the stylus. The co-pending application Serial No. 772,934, filed September 9, 1947, is referred to for further details of this phase of the pickup construction, which does not by itself form a part of the present invention.

The two elastomer pads 33 are held in their proper operative position against opposite sides of the generally flat lever-like transducer structure 30 by a housing (Figs. 4–9) shown consisting of two housing wall sections 35 suitably secured to each other. In the form shown, the housing sections 35 are of metal and their forward ends are secured to each other by tongue extensions 36 extending from one wall section 35 over the opposite wall section, and inwardly bent in overlapping relation into a slit 37 formed in the opposite wall section.

In the pickup shown in Figs. 1 to 9, the rear portions opposite the housing wall sections 35 are secured to each other by two hollow rivets 41, 42 of suitable metal, such as brass.

The metallic backing strip 32 of the piezo-electric transducer 30 has a rearwardly extending mounting portion of greater width which is utilized for fixing the transducer 30 against angular displacement relatively to the housing 35 in a generally vertical plane. To this end, the wide rearward mounting extension 39 of the backing strip 32 is retained clamped by the two rivets between the two housing wall sections 35, insulating spacers 43 and metallic terminals being interposed between the housing side walls 35 to provide a firm clamping connection fixing the angular position of the transducer 30 within the housing 35. Insulating sleeves 44 are also interposed between the hollow rivets 41, 42 and the adjacent conducting elements of the cartridge-like assembly 40. Each of the relatively insulated metallic terminal strips 46 holds clamped with its inward surface the rearward mounting portion 47 of a forwardly extending strip-like contact tongue 48 of spring metal which is held pressed and biased into contact engagement with the outer electrode surfaces of the two piezo-electric transducer elements 31, thus providing electric connections from the opposite-polarity outer electrode surfaces of the two piezo-electric transducer elements 31 to the external terminal strips 46 of the cartridge.

To the forward drive end of the transducer strip 30—composed of portions of the opposite transducer elements 31 united to the opposite sides of the forward portion of the backing strip 32—is secured, as by body or layer of insulating cement layer, junction portion 51 of a stylus drive rod or stylus arm 52 carrying at its front end the stylus 21. The stylus drive-rod 52 is shown made of a strip of spring metal such as berillium copper provided at its rear end with the two tongue extensions folded into the U-shaped junction 51 portion which is united by insulating cement to the forward end of the transducer 30.

The two metallic housing side walls 35 are provided with forwardly tapering wall extensions 54 coaxial with and positioned on both sides of the flexible stylus drive-rod 52 and terminating in two forwardly projecting stylus guards 55 arranged so that when the tone-arm 15 with the pickup carried thereby is dropped on a record disc, the relatively rigid stylus guards 55 will take up any shock and assure that the stylus 21 and its drive-arm 52 are not injured.

The pickup transducer cartridge 40 described above is held affixed to the forward end of the tone-arm by a mounting structure generally designated 60 which may be of sheet metal and is provided with a mounting arm 61 suitably secured, as by two screws 62, to a mounting boss 63 forming a fixed part of the forward end of the tone-arm 15 (Figs. 1, 2).

As shown in Figs. 2 and 3 and in the still more enlarged view of Fig. 2–*a*, the forward end of the flexible stylus drive rod 52 holds affixed therein two oppositely directed stylus elements 21. Each stylus element 21 is of conical shape and the stylus axis 21–1 of each of the two stylus elements are coaxially aligned.

In accordance with the invention, the stylus 21 of the pickup 20 is so supported by the stylus drive-rod 52 within the record groove 14 as to maintain the axis 21–1 of the conical or pointed stylus tip under an angle less than about 85° and more than about 40° relatively to the forward transducing direction of motion of the record groove 14, which direction of motion is designated 14–1 in Figs. 2 and 2–*a*.

I have discovered that in pickups operating with light stylus pressure, such as about 5 grams, critically important advantages are assured by maintaining an acute angle between about 85° and 45° between the axis 21–1 of the stylus and the forward transducing direction 14–1 of the record groove trace 14 scanned by the stylus. With the stylus axis maintained under such acute angle relative to the transducing direction, the friction forces exerted on the stylus by the moving record groove are transmitted to its drive-arm 52 predominantly in the form of tension forces, so that the substantially entire effective length of the flexible stylus drive-rod is maintained under axially acting tension strains without being subjected to substantial longitudinal compression forces. With the foregoing stylus mounting only relatively small or negligible, compressive forces are imparted to the stylus arm by the frictional forces transmitted thereto by the stylus. This in turn results in a highly effective suppression of forces tending to cause chattering of the stylus while scanning the groove even if the stylus pressure with which it scans in the moving undulatory groove is only very small, for instance, about 5 grams.

According to the invention, the stylus drive-rod 52 has its longitudinal axis positioned under such angle relatively to the forward transducing direction 14–1 of the record trace so as to maintain the axis 21–1 of the stylus tip under an acute angle, in the range between about 45° to 85° relatively to the forward transducing direction. Accordingly, the longitudinal axis of the stylus drive-rod has to be maintained under an obtuse angle corresponding in the range from about 140° to about 175° relatively to the transducing direction.

The pickup shown in Figs. 1 to 9—being intended for use with a laterally undulating record groove trace—has the stylus drive-rod 52 designed to be relatively stiff in a direction perpendicular to a vertical plane through its longitudinal axis and to be relatively flexible in the direction of such plane so as to bias the stylus with only very slight pressure forces towards the scanned record groove, the drive-rod having sufficient lateral stiffness for transmitting to the transducer 30 the lateral forces exerted on the stylus by the lateral undulations of the record groove. By way of example, in the particular pickup of the invention described and shown herein, the stylus axis is maintained at angle of about 68° relatively to the record playing direction.

According to another phase of the invention, the flexible stylus drive-rod of a phonograph pickup of the foregoing type is so arranged as to permit turning the flexible stylus drive-rod around its longitudinal axis, and the front end of the stylus drive-rod is provided with two oppositely directed styli, each extending substantially perpendicular to the axial direction of the stylus drive-rod so that by rotating the stylus drive-rod 180° either one of the two styli will operate to translate the sound record of a groove record trace into corresponding electric voltages with a high degree of fidelity.

In the form of the invention embodied in the pickup shown in Figs. 1 to 9, the flexible stylus drive-rod 52 is arranged to extend coaxial with the central elongated axes of the transducer cartridge 40 and its mechano-electric transducer structure 30. As shown in the greatly enlarged detail view of Fig. 2–a, the front end of the stylus arm 52 is arranged to hold affixed therein two oppositely projecting conical stylus elements 21. The two conical stylus elements 21 may form part of a rigid stylus structure having oppositely directed pointed stylus tips or they may be formed of two independent stylus units, each held anchored within a mounting collar 21–2 forming part of the forward drive portion of the flexible stylus arm 52, each stylus unit 21 terminating in an oppositely directed stylus tip. With this mounting arrangement of the two conical stylus elements 21, the wide conical base surfaces of the two stylus elements are closely adjacent to each other and the total overall height of the two coaxially aligned stylus elements 21 is less than about four times the widest base region of each conical stylus element 21.

It will be noted that the two oppositely directed pointed stylus tips 21 held at the front end of the tone-arm 52 have conically shaped outwardly projecting pointed ends projecting in opposite directions with the axes of each conical tip substantially perpendicular to the axis of the flexible tone-arm. Furthermore, the stylus drive-rod 52 is mounted for rotation about its longitudinal axis, and it is axially positioned under such angle relative to the forward direction of motion (or the transducing direction) of the record traces, that by rotating it 180° about its longitudinal axis, the tip of one or the other of the two styli is automatically brought into the same acute angular-axis position relatively to the forward transducing direction 14–1 of the moving record groove trace.

In the pickup arrangement of the invention shown in Figs. 1 to 9, the cartridge 40 with its forwardly extending coaxial stylus arm 52 is arranged to be rotatably supported within the mounting structure 60 by means of which it is held affixed to the forward end of the tone-arm 15. Furthermore, the rotary mounting of the transducer cartridge 40 with its coaxial stylus arm 52 is so arranged that its axis of rotation within the mounting structure is coaxial with the axis of the stylus arm and the transducer cartridge. To this end, the cartridge 40 is shown seated and fixed within a cylindical guide sleeve 65 which in turn is mounted for rotation within a rotary guide structure 66 forming part of the mounting structure 60.

The cylindrical guide sleeve 65 of the transducer cartridge 40 is shown formed of a relatively short metal tube within which the generally rectangular transducer housing 35 is tightly and fixedly seated (Figs. 4, 5, 8, 9) so as to provide a cylindical rotary guide surface for the transducer cartridge. The rotary guide support 66 of the cartridge mounting structure 60 is shown formed of a firm strip of spring metal having an intermediate portion affixed, as by welding, to a part of the mounting arm 61 of the bracket structure. The rotary guide support strip 66 of the mounting structure 60 is shaped to provide two cylindrically arched guide surface arms guidingly clamping the opposite sides of the guide sleeve 63 of the transducer structure so as to provide a firm operative support therefor permitting rotation of the transducer cartridge by an angle of 180° from one stylus position to a 180° displaced stylus position. The two rotary guide arms 66 are provided along their downward edges with outwardly flaring lips 68 so as to permit bending apart of the two rotary guide arms 66 against their elastic restoring forces, and removal of the cartridge 40 with its guide sleeve 63 from its position within the rotary guide structure 66, as well as replacement of the cartridge structure within its rotary guide structure 66.

The transducer cartridge 40 and its rotary guide structure support 66 are also provided with limit elements for limiting the range of rotation of the cartridge to 180° corresponding to its two opposite styli positions. In the form of pickup shown, the cartridge structure is provided to this end with a limit projection in the form of a pin 71 confined to move within an arcuate slot 72 formed within the strip member of the rotary guide arms 66 of the mounting structure. The opposite ends of the guide slot 72 formed in the two arcuate guide arms 66 of the mounting structure serve as opposite end-stops for the guide pin 71 of the cartridge fixing the opposite or operative positions of the transducer cartridge stylus arm 52 in which one or the opposite of the two styli is positioned to maintain operative engagement with record groove trace 14 for translating its undulatory record into corresponding electric signal waves generated by the transducer structure 30 of the pickup.

The transducer structure cartridge 40 is also provided with a grip which may be manually operated for turning the cartridge and its stylus arm from one stylus position to the 180° displaced operative stylus position. In the form shown, the grip is provided by a grip pin 75 secured, as by riveting, to one of the two forward wall extensions 54 of the housing walls 35 of the cartridge 40. The grip pin 75 projects outwardly in a generally horizontal position so that upon lifting the tone-arm slightly above the record disc the grip 75 may be seized with the finger and moved 180° to an opposite horizontal position, thereby turning the stylus arm 180° and bringing the opposite of the two styli 21 into the operative position relatively to the record grooves 14 of the record disc 13.

Figures 10, 11, 12, 13:
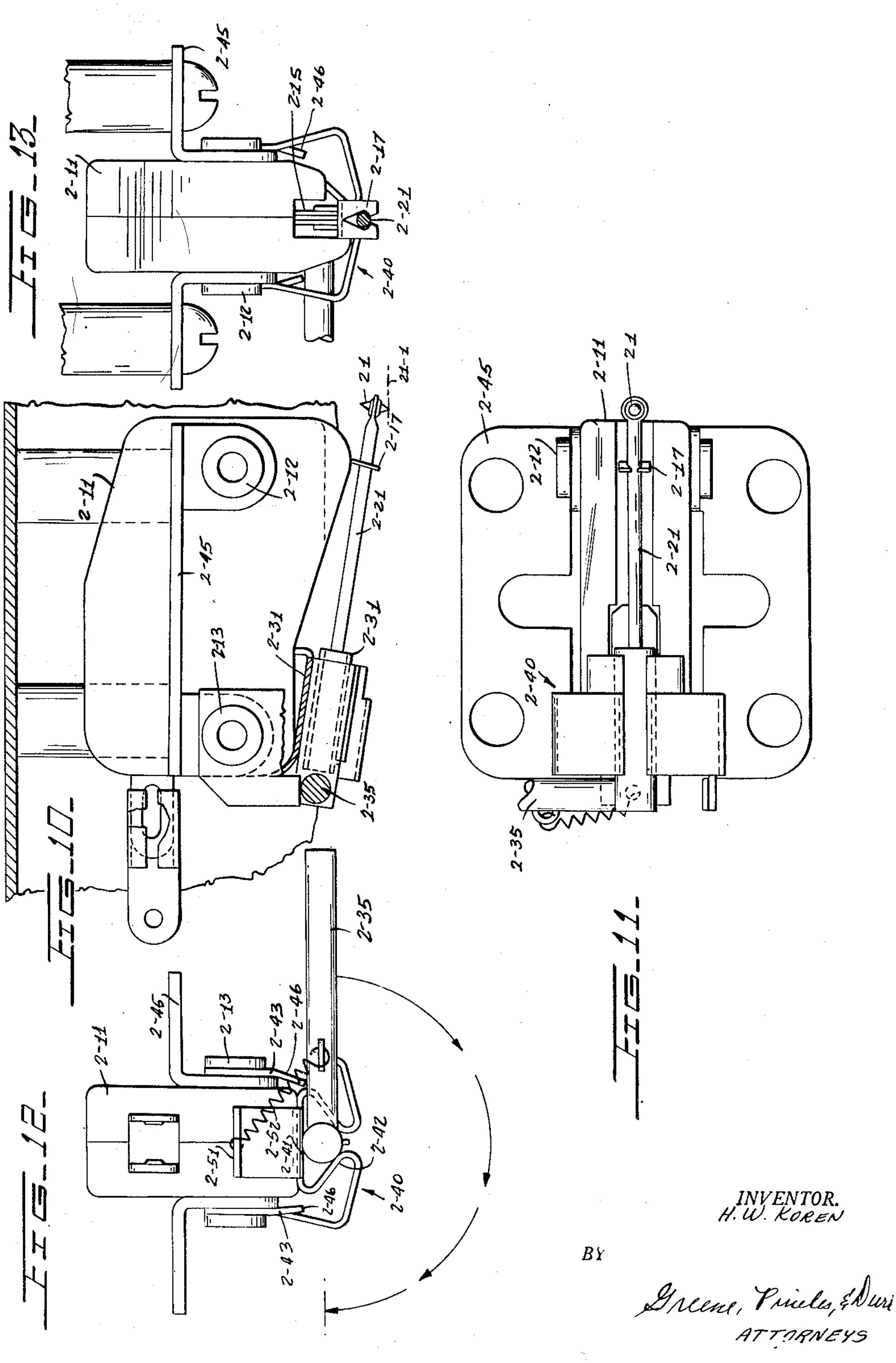
Fig. 10 is a side view of another form of a phonograph pickup combined with a stylus drive exemplifying the invention.
Fig. 11 is the bottom view of the pickup of Fig. 10.
Fig. 12 is the rear end view of the pickup of Fig. 10.
Fig. 13 is the front end view of the phonograph pickup of Fig. 10.

Figs. 10 to 11 show another form of pickup having a stylus drive-arm carrying at its front end two oppositely directed styli and arranged to be rotated about its inclined longitudinal axis. As in the pickup of Figs. 1 to 9, the stylus axis is maintained under such angle relatively to the transducing direction so that either one of the two styli may be brought into the operative groove scanning position with the axis of each stylus at the desired acuate angle relative to the forward transducing direction. The pickup shown comprises a piezo-electric transducer structure generally similar to that of Figs. 1 to 9 held in its operative position between the two housing walls 2–11 held affixed to each other by a set of two rivets or screws 2–12, 2–13, as shown. To the forward end of the elongated piezo-electric transducer assembly 2–15, (similar to the transducer assembly 30 of Figs. 1 to 9) is secured, as by an insulating cement, a downwardly extending drive extension 2–17 projecting beyond the boundary of the casing walls 2–11. The drive extension 2–17 may be formed of a piece of sheet metal bent to provide at its rear two U-shaped fastening elements which are united, as by an insulating cement, to the forward end of the piezo-electric transducer structure 2–15, and being similar in this respect to the U-shaped junction portion 15 of the stylus tone-arm 52 of the pickup shown in Figs. 1 to 9. The downwardly projecting drive-end of the drive extension 2–17 is provided with a recess of perforation for receiving therein and holding in coupled driving engagement the forward region of a stylus drive-rod 2–21 extending lengthwise below the bottom center region of the pickup housing walls 2–11.

The stylus drive-arm 2–21 may be formed of a resiliently flexible strip or tubing of metal, and is shown carrying at its front end two oppositely projecting styli 21 which are held therein in the same relative positions as the corresponding styli of the stylus arm 52 shown in Figs. 1 to 9.

The rear part of the thin flexible stylus drive-arm 2–21 is provided with a rotary guide sleeve 2–31 arranged to be rotated for limited angular movement of 180° within a rotary guide structure generally designated 2–40 secured and carried by the bottom rear part of the pickup housing walls 2–11. The rotary guide structure is shown formed of sheet metal shaped and bent to provide out of an intermediate portion thereof three segments 2–41, 2–42 of a rotary guiding seat for the guide sleeve 2–31 constituting the rear part of the stylus drive-arm 2–21. In the form shown, the rotary guide structure 2–40 is provided with end-arm extensions, extending from the guide segments 2–42 and bent to form mounting ears 2–43 by means of which it is held affixed by the rear fastening nut or screw 2–13 to the parallel outer surfaces of the two housing walls 2–11 of the pickup, so as to provide a positive rotary guide support for the stylus tone-arm 2–21 in the position in which it is shown in Fig. 10, where its lower stylus 21 is held in an axial position in which it scans an undulatory record groove 14 moving relatively to the stylus in a forward transducing direction 21–1. The two sets of rivets or screws, 2–12, 2–13 serve also to clamp to the outer surfaces of the housing walls 2–11, angular fastening lugs by means of which the pickup is fastened to a fastening boss 63 of the forward part of the tone-arm 15 in a manner similar to the pickup shown in Fig. 1.

The fastening ears 2–43 of the rotary guide structure 2–40 of the stylus guide sleeve 2–31 are also provided with two stop portions 2–46 forming opposite limit stops limiting to 180° the angular movement of a laterally-extending turn-grip 2–35 of the stylus guide sleeve 2–31. With this arrangement, it is merely necessary to seize the outer end of the rotary turn-grip 2–35 of the stylus guide sleeve 2–31 and turn it 180° from one stop 2–46 against the other stop whenever it is desired to selectively bring another of the two opposite styli of the stylus arm 2–21 into the operative groove-scanning position shown in Fig. 10. It should be noted that the retaining recess 2–18 of the transducer drive extension 2–17 within which the forward region of the stylus arm 2–21 is couplingly held, provides a rotary seat therefor so that the stylus drive-arm 2–21 may be readily turned 180° by its turn-grip 2–35 for selectively bringing either one of the two styli into the groove-scanning position shown in Fig. 10.

Pickups of the type shown above, may be also readily provided with means for bringing the turn-over stylus drive-rod to one of its opposite operative end positions whenever the stylus drive-rod and its rotary guide support is turned from one end position past the midway position toward the opposite end position. Thus as shown in Figs. 1 and 12, a tail portion 2–51 of the center segment 2–41 of the rotary guide structure 2–40 of the pickup may be utilized as a support for one end of a biasing spring 2–52, the other end of which engages a perforation or ear of the turn-over grip 2–35 so that once the grip 2–35 is turned from one end position past the midway position, the biasing action of the spring 2–52 will bring the grip 2–35 and therewith the guide sleeve 2–31 with its stylus drive-rod 2–21 and its two styli to the opposite stylus end position.

In a similar manner, the pickup shown in Figs. 1 to 9 may be provided with a spring 80 having an intermediate portion secured, as by welding, to the mounting arm 61, and having two loop end portions bent so that when the cartridge 40 is turned by its grip 75 from one end position to the other end position, the guide pin 71 of the cartridge on moving to the end position to which it is being brought, will be urged by the spring forces of the looped spring wire portion 80 to the position, for instance, to which it is shown biased in Fig. 1.

The features and principles underlying the invention described above in connection with specific exemplifications, will suggest to those skilled in the art many other modifications thereof. It is accordingly desired that the appended claims shall not be limited to any specific features or details shown and described in connection with the exemplifications thereof.

I claim:

1. In a record transducing pickup for transducing undulations of a record groove moving in a record playing direction, a mechano-electric transducer structure and a mounting structure therefor carrying a transducer drive portion of said transducer structure in a relatively movable position for generating electric signals corresponding to forces imparted to said transducer drive portion by undulations of said groove, an elongated relatively flexible drive member drivingly connected to said transducer drive portion and extending with its longitudinal axis in generally the same direction as the playing direction, and two stylus elements, each having a stylus axis and each having an axially positioned stylus tip arranged to scan and be moved by the undulations of the record groove while in scanning engagement therewith, a flexibly movable portion of said drive member holding affixed therein said two stylus elements with the stylus tips of the two stylus elements extending in generally opposite directions from said drive member portion, said mounting structure including a rotary guide structure rotatably holding said transducer structure with its flexible drive member for rotary movement over a range of about 180° about the axis of said drive member for rotating said stylus elements between one scanning position in which one of said stylus elements is maintained in scanning engagement with said record groove and an opposite scanning position in which the other of said stylus elements is maintained in scanning engagement with the record groove.

2. In a record transducing pickup for transducing undulations of a record groove moving in a record playing direction, a stylus drive structure for driving the mechanoelectric transducer structure of said pickup comprising an axially extending elongated drive member arranged to be drivingly connected to said transducer structure, and having a rotatable seating region arranged to be rotatably supported for rotation about the axis of said drive member, said drive member having a coaxially extending elongated flexible drive portion carrying at its end two styli joined with their inward ends to a common mounting element of said flexible drive portion and extending outwardly therefrom in a plane transverse to said axis so that rotation of said drive member about its axis shall bring either one of said styli into record engaging operative stylus position, said drive member holding each of said styli in positions in which the axis of the stylus element engaging the record groove is maintained at an acute angle less than 85° and more than 45° to the transducing direction.

3. In a transducing pickup as claimed in claim 1, said rotary guide structure including mounting elements rotatably holding said transducer structure in said mounting structure, said transducer structure having a longitudinal axis coaxial with said drive member and being rotatable therewith between said two opposite scanning positions.

4. In a transducing pickup as claimed in claim 3, said mounting structure comprising means for attaching the same to the pickup to maintain said transducer structure and said drive member in each of their two oppositie scanning positions with their longitudinal axes extending generally under an angle less than about 185° and more than about 150° relatively to said transducing direction.

5. In a transducing pickup as claimed in claim 1, said mounting structure comprising means for attaching the same to the pickup to maintain said drive member in each of its opposite scanning positions with its longitudinal axis extending generally under an angle less than about 185° and more than about 150° relatively to said transducing direction.

6. In a transducing pickup as claimed in claim 1, each stylus element being of substantially conical shape with the cone apex constituting the stylus tip, the overall height of said two coaxially affixed stylus elements being at most about four times the maximum width of the wider base portion of each stylus element.

7. In a transducing pickup as claimed in claim 2, each stylus element being of substantially conical shape with the cone apex constituting the stylus tip, the overall height of said two coaxially affixed stylus elements being at most about four times the maximum width of the wider base portion of each stylus element.

8. In combination with a stylus drive structure as claimed in claim 2, a mounting structure associated with said mechano-electric transducer structure having guide portions for rotatably supporting the seating region of said elongated drive member.

9. In combination with a stylus drive structure as claimed in claim 2, a mechano-electric transducer structure of which said drive member forms a part and arranged to rotate therewith about its axis, and a mounting structure having guide portions for rotatably supporting said transducer structure, and said drive member for rotation about said axis.

10. In a record transducing pickup for transducing undulations of a record groove moving in a record playing direction, a stylus drive structure for driving the mechanoelectric transducer structure of said pickup comprising an axially extending elongated drive member arranged to be drivingly connected to said transducer structure and having a rotatable seating region arranged to be rotatably supported for rotation about the axis of said drive member, said drive member having a coaxially extending elongated flexible drive portion carrying at its end two styli joined with their inward ends to a common mounting element of said flexible drive portion and extending outwardly therefrom in a plane transverse to said axis so that rotation of said drive member about its axis shall bring either one of said styli into record engaging operative stylus position, and means for holding the longitudinal axis of said flexible drive member in an inclined position relatively to said playing direction.

11. In combination with a stylus drive structure as claimed in claim 10, a mounting structure associated with said mechano-electric transducer structure having guide portions for rotatably supporting the seating region of said elongated drive member.

12. In combination with a stylus drive structure as claimed in claim 10, a mechano-electric transducer structure of which said drive member forms a part and arranged to rotate therewith about its axis, and a mounting structure having guide portions for rotatably supporting said transducer structure, and said drive member for rotation about said axis.

References Cited in the file of this patent

UNITED STATES PATENTS

| | | |
|---|---|---|
| 1,861,831 | Dunning | Aug. 4, 1931 |
| 1,822,932 | Loughridge | Sept. 15, 1931 |
| 2,174,692 | Dunning | Oct. 3, 1939 |
| 2,542,457 | Balmer | Feb. 20, 1951 |